US009857794B1

(12) United States Patent
Jarrell et al.

(10) Patent No.: US 9,857,794 B1
(45) Date of Patent: Jan. 2, 2018

(54) SYSTEM FOR CONTROLLING POSITION AND SPEED OF A MARINE VESSEL

(71) Applicant: Brunswick Corporation, Lake Forest, IL (US)

(72) Inventors: Matthew David Jarrell, Oshkosh, WI (US); Robert Raymond Osthelder, Oshkosh, WI (US); Kenneth G. Gable, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 54 days.

(21) Appl. No.: 14/807,252

(22) Filed: Jul. 23, 2015

(51) Int. Cl.
*G05D 1/02* (2006.01)
*B63H 25/04* (2006.01)

(52) U.S. Cl.
CPC ........... *G05D 1/0206* (2013.01); *B63H 25/04* (2013.01)

(58) Field of Classification Search
CPC .............................. G05D 1/0206; B63H 25/04
See application file for complete search history.

(56) References Cited

U.S. PATENT DOCUMENTS

| 3,688,252 A | 8/1972 | Thompson |
| 3,715,571 A | 2/1973 | Braddon |
| 3,771,483 A | 11/1973 | Spencer |
| 4,253,149 A | 2/1981 | Cunningham et al. |
| 4,428,052 A | 1/1984 | Robinson et al. |
| 4,513,378 A | 4/1985 | Antkowiak |

(Continued)

FOREIGN PATENT DOCUMENTS

| JP | 2926533 B2 | 7/1997 |
| JP | 5042906 B2 | 7/2012 |

(Continued)

OTHER PUBLICATIONS

Poorman et al., Multilayer Control System and Method for Controlling Movement of a Marine Vessel, Unpublished U.S. Appl. No. 11/965,583, filed Dec. 27, 2007.

(Continued)

*Primary Examiner* — Jerrah Edwards
*Assistant Examiner* — Majdi Alsomiri
(74) *Attorney, Agent, or Firm* — Andrus Intellectual Property Law, LLP

(57) ABSTRACT

A system and non-transient computer readable medium for executing a method for controlling position and speed of a marine vessel propelled by a marine propulsion device along a route including a plurality of waypoints are disclosed. An input source provides the plurality of waypoints to a controller, each individual waypoint being associated with a respective operator-selected desired speed of the marine propulsion device. A position determination device determines an actual geographical location of the vessel, and a speed sensor determines an actual speed of the marine propulsion device. The controller receives a given waypoint and its respective desired speed from the input source, the actual geographical location from the position determination device, and the actual speed from the speed sensor. The controller compares these values and outputs commands to propel the marine vessel to the given waypoint and concurrently to operate the marine propulsion device at the respective desired speed.

15 Claims, 4 Drawing Sheets

(56) References Cited

U.S. PATENT DOCUMENTS

| | | | |
|---|---|---|---|
| 4,893,127 A * | 1/1990 | Clark | G01S 13/86 340/961 |
| 4,939,661 A | 7/1990 | Barker et al. | |
| 4,975,709 A | 12/1990 | Koike | |
| 5,172,324 A | 12/1992 | Knight | |
| 5,202,835 A | 4/1993 | Knight | |
| 5,268,844 A * | 12/1993 | Carver | G01C 21/22 342/452 |
| 5,331,558 A | 7/1994 | Hossfield et al. | |
| 5,362,263 A | 11/1994 | Petty | |
| 5,386,368 A | 1/1995 | Knight | |
| 5,390,125 A | 2/1995 | Sennott et al. | |
| 5,404,648 A * | 4/1995 | Taylor, Jr. | G01C 21/20 33/431 |
| 5,491,636 A | 2/1996 | Robertson et al. | |
| 5,736,962 A | 4/1998 | Tendler | |
| 5,884,213 A | 3/1999 | Carlson | |
| 6,059,226 A | 5/2000 | Cotton et al. | |
| 6,092,007 A | 7/2000 | Cotton et al. | |
| 6,230,642 B1 | 5/2001 | McKenney et al. | |
| 6,234,853 B1 | 5/2001 | Lanyi et al. | |
| 6,273,771 B1 | 8/2001 | Buckley et al. | |
| 6,308,651 B2 | 10/2001 | McKenney et al. | |
| 6,377,889 B1 | 4/2002 | Soest | |
| 6,446,003 B1 | 9/2002 | Green et al. | |
| 6,485,341 B1 | 11/2002 | Lanyi et al. | |
| 6,604,479 B2 | 8/2003 | McKenney et al. | |
| 6,678,589 B2 | 1/2004 | Robertson et al. | |
| 6,885,919 B1 * | 4/2005 | Wyant | B63H 21/12 340/450.2 |
| 6,995,527 B2 | 2/2006 | DePasqua | |
| 7,267,068 B2 | 9/2007 | Bradley et al. | |
| 7,268,703 B1 | 9/2007 | Kabel et al. | |
| 7,305,928 B2 | 12/2007 | Bradley et al. | |
| 7,366,593 B2 | 4/2008 | Fujimoto et al. | |
| 7,398,742 B1 | 7/2008 | Gonring | |
| 7,416,458 B2 | 8/2008 | Suemori et al. | |
| 7,467,595 B1 | 12/2008 | Lanyi et al. | |
| 7,476,134 B1 | 1/2009 | Fell et al. | |
| 7,538,511 B2 | 5/2009 | Samek | |
| 7,561,886 B1 | 7/2009 | Gonring et al. | |
| 7,577,526 B2 | 8/2009 | Kim et al. | |
| 7,727,036 B1 | 6/2010 | Poorman et al. | |
| 8,050,630 B1 | 11/2011 | Arbuckle | |
| 8,082,100 B2 | 12/2011 | Grace et al. | |
| 8,145,370 B2 | 3/2012 | Borrett | |
| 8,145,371 B2 | 3/2012 | Rae et al. | |
| 8,155,811 B2 * | 4/2012 | Noffsinger | B61L 3/006 701/21 |
| 8,233,919 B2 * | 7/2012 | Haag | G06Q 50/26 340/539.13 |
| 8,265,812 B2 | 9/2012 | Pease | |
| 8,386,145 B2 * | 2/2013 | Rothschild | B60K 31/185 340/466 |
| 8,417,399 B2 | 4/2013 | Arbuckle et al. | |
| 8,478,464 B2 | 7/2013 | Arbuckle et al. | |
| 8,480,445 B2 | 7/2013 | Marvin | |
| 8,510,028 B2 | 8/2013 | Grace et al. | |
| 8,515,660 B2 | 8/2013 | Grace et al. | |
| 8,515,661 B2 | 8/2013 | Grace et al. | |
| 8,527,192 B2 | 9/2013 | Grace et al. | |
| 8,543,324 B2 | 9/2013 | Grace et al. | |
| 8,645,012 B2 | 2/2014 | Salmon et al. | |
| 8,694,248 B1 | 4/2014 | Arbuckle et al. | |
| 8,727,056 B2 * | 5/2014 | Nagda | G01C 21/26 180/170 |
| 8,761,976 B2 | 6/2014 | Salmon et al. | |
| 8,777,681 B1 | 7/2014 | McNalley et al. | |
| 8,807,059 B1 | 8/2014 | Samples et al. | |
| 8,831,868 B2 | 9/2014 | Grace et al. | |
| 8,924,054 B1 | 12/2014 | Arbuckle et al. | |
| 9,039,468 B1 | 5/2015 | Arbuckle et al. | |
| 9,132,900 B2 | 9/2015 | Salmon et al. | |
| 9,132,903 B1 | 9/2015 | Gable et al. | |
| 9,162,743 B2 | 10/2015 | Grace et al. | |
| 9,248,898 B1 | 2/2016 | Kirchhoff et al. | |
| 9,359,057 B1 | 6/2016 | Andrasko et al. | |
| 9,377,780 B1 | 6/2016 | Arbuckle et al. | |
| 2004/0006423 A1 * | 1/2004 | Fujimoto | G05D 1/0206 701/467 |
| 2004/0221787 A1 | 11/2004 | McKenney et al. | |
| 2005/0170713 A1 | 8/2005 | Okuyama | |
| 2006/0089794 A1 | 4/2006 | DePasqua | |
| 2007/0032923 A1 | 2/2007 | Mossman et al. | |
| 2007/0089660 A1 | 4/2007 | Bradley et al. | |
| 2007/0162207 A1 | 7/2007 | Shimo et al. | |
| 2007/0203623 A1 | 8/2007 | Saunders et al. | |
| 2009/0037040 A1 | 2/2009 | Salmon et al. | |
| 2012/0248259 A1 | 10/2012 | Page et al. | |
| 2014/0052366 A1 * | 2/2014 | Rothschild | B60K 31/185 701/118 |
| 2014/0114509 A1 | 4/2014 | Venables et al. | |
| 2014/0277851 A1 | 9/2014 | Grace et al. | |

FOREIGN PATENT DOCUMENTS

| | | |
|---|---|---|
| JP | 5226355 B2 | 7/2013 |
| WO | 9205505 A1 | 4/1992 |

OTHER PUBLICATIONS

Kirchhoff, Thomas, Systems and Methods for Controlling Speed of a Marine Vessel, Unpublished U.S. Appl. No. 14/258,516, filed Apr. 22, 2014.

Arbuckle et al., Systems and Methods for Determining a Heading Value of a Marine Vessel, Unpublished U.S. App. No. 14/200,831, filed Mar. 7, 2014.

Andrasko et al., "System and Method for Controlling Handling of a Marine Vessel", U.S. Appl. No. 4/484,702, filed Sep. 12, 2014.

* cited by examiner

US 9,857,794 B1

SYSTEM FOR CONTROLLING POSITION AND SPEED OF A MARINE VESSEL

FIELD

The present disclosure relates to systems, methods, and methods that can be carried out by a processor for controlling position and speed of marine vessels propelled by marine propulsion devices.

BACKGROUND

The below U.S. patents and U.S. patent applications are hereby incorporated herein by reference.

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,727,036 discloses a system and method for controlling movement of a marine vessel. An operator controllable device outputs a signal that is representative of an operator-desired rate of position change of the vessel about or along an axis. A sensor outputs a signal that is representative of a sensed actual rate of position change of the vessel about or along the axis. A rate of position change controller outputs a rate of position change command based upon the difference between the desired rate of position change and the sensed rate of position change. A vessel coordination controller controls movement of the vessel based upon the rate of position change command.

Unpublished U.S. patent application Ser. No. 14/200,831, filed on Mar. 7, 2014, discloses a method for determining a heading value of a marine vessel that includes determining a first estimate of a direction of the marine vessel based on information from a first source and determining a second estimate of a direction of the marine vessel based on information from a second source. The method includes inputting the first estimate and the second estimate to a control circuit, which scales each of the first estimate and the second estimate and adds the scaled estimates together so as to determine the heading value. A system for determining a heading value of a marine vessel is also disclosed.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one example of the present disclosure, a system for controlling position and speed of a marine vessel propelled by a marine propulsion device along a route comprising a plurality of waypoints is described. A controller is provided in signal communication with the marine propulsion device. An input source provides the plurality of waypoints to the controller, each individual waypoint in the plurality of waypoints being associated with a respective operator-selected desired speed of the marine propulsion device. A position determination device determines an actual geographic location of the marine vessel. A speed sensor determines an actual speed of the marine propulsion device. The controller receives a given waypoint and its respective desired speed from the user interface, the actual geographical location from the position determination device, and the actual speed from the speed sensor. The controller compares the actual geographical location to the given waypoint and the actual speed to the respective desired speed, and outputs commands to propel the marine vessel to the given waypoint and concurrently to operate the marine propulsion device at the respective desired speed.

According to another example of the present disclosure, a non-transient computer readable medium programmed with computer readable code that upon execution by a processor causes the processor to execute a method for controlling position and speed of a marine vessel propelled by a marine propulsion device along a route comprising a plurality of waypoints is disclosed. The method includes accepting the plurality of waypoints from an input source, each individual waypoint in the plurality of waypoints being associated with a respective operator-selected desired speed of the marine propulsion device. The method also includes sending, the plurality of waypoints and the respective desired speeds to a marine propulsion system controller, which thereafter outputs commands to propel the marine vessel to the given waypoint and concurrently to operate the marine propulsion device at the respective desired speed.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
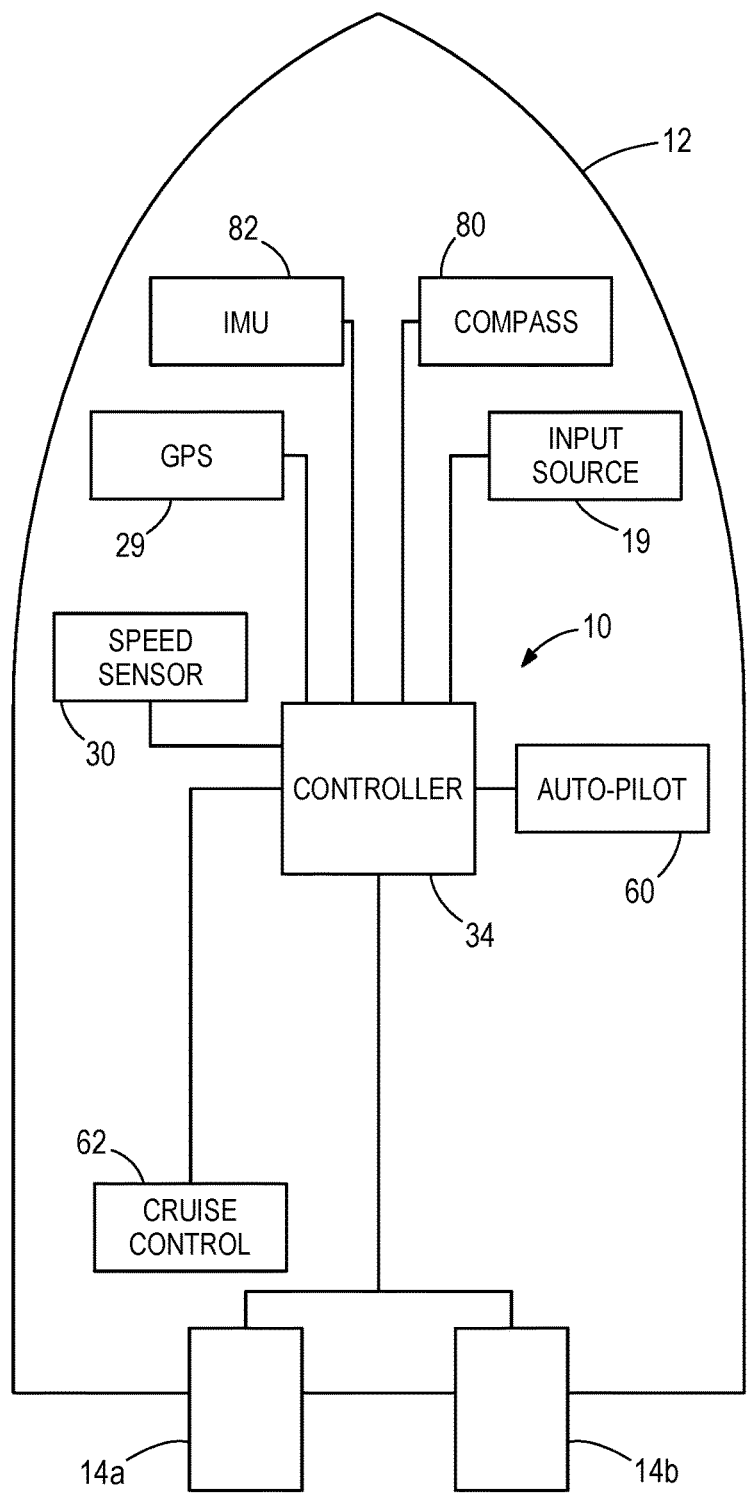
FIG. 1 is a schematic depiction of a marine vessel having two marine propulsion devices associated therewith.
Figure 2:
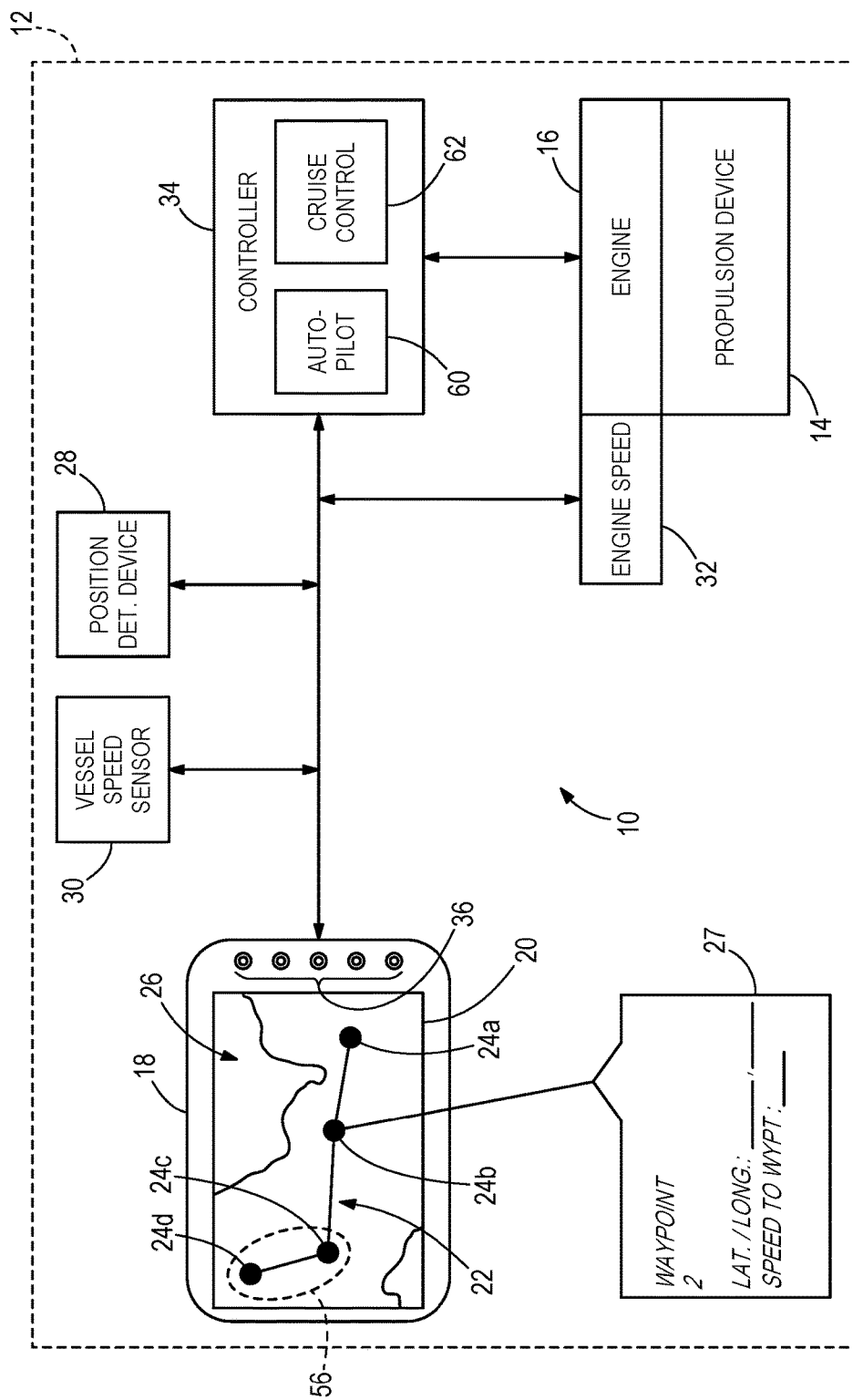
FIG. 2 is a schematic depiction of a system for controlling position and speed of a marine vessel according to the present disclosure.

FIG. 1 schematically depicts a marine vessel 12 including two marine propulsion devices 14a, 14b, although fewer or more propulsion devices could be provided. The propulsion devices 14a, 14b can be any type of marine propulsion device, such as for example, pod drives, sterndrives, outboards, or jet drives. The propulsion devices 14a, 14b are communicatively connected to a controller 34, such as for example an electronic control unit (ECU). The propulsion devices 14a, 14b may alternatively have their own engine control units, which in turn would be connected to the controller 34, which in this case could be located at the helm of the marine vessel 12. In the example shown herein, however, only one controller 34 is shown for simplicity, and the controller 34 sends signals to control the magnitude of thrust produced by the propulsion devices 14a, 14b in order to propel the marine vessel 12 at a desired speed, as will be described farther herein below. The position of the marine vessel 12 can be controlled either by positioning the propulsion device itself (such as with an outboard motor or a sterndrive) or by positioning a rudder of the marine vessel 12 to change the direction of the marine vessel 12. The precise propulsion device and apparatus by which the marine vessel 12 can change its direction are not limiting on the scope of the present disclosure. For example, although the propulsion device 14 shown in FIG. 2 is powered by an engine 16, the propulsion device 14 could instead be propelled by an electric motor. For purposes of simplicity, the controller 34 will be described as controlling the direction and magnitude of thrust of the propulsion devices 14a, 14b, although it should be understood that the controller 34 could alternatively control the position of a rudder, reversing bucket, trim tab, or the like in order to control the direction of the marine vessel 12.

Returning to FIG. 1, the controller 34 may be communicatively connected to an autopilot system 60, which provides inputs to the controller 34 to control the direction and magnitude of thrust of the propulsion devices 14a, 14b with little or no continual input required from the operator of the marine vessel 12. For example, the controller 34 may also be communicatively connected to an input source 19, such as for example a chart plotter, which may provide a series of waypoints to which the marine vessel 12 is to be guided while under the control of the autopilot system 60. Alternatively, the autopilot system 60 may allow an operator of the marine vessel 12 to select a single waypoint to which the marine vessel 12 is to be guided, such as by way of the input source 19. Besides being a chart plotter, the input source 19 could be a different device communicating with the controller 34 via a network connection, a drive or other storage device communicating with the controller 34 via a USB or similar port, a smart phone or tablet, a PDA, a gauge, a keyboard, a mouse, a computer-readable disc, or any number of other input devices and/or peripherally connectable devices suitable for entering or uploading information to the controller 34.

The controller 34 may also be communicatively connected to a compass 80, an inertial measurement unit (IMU) 82, a GPS receiver 29, and/or a vessel speed sensor 30. The compass 80 can be, for example, a solid state compass or a flux gate compass, although a gyroscope could also be used. The GPS receiver 29 may provide the location, speed, and direction of the marine vessel 12, and in one example can be provided by Mercury Marine of Fond du Lac, Wis., part number 8M0046321. The IMU 82 can also be provided by Mercury Marine of Fond du Lac, Wis., part number 79-8M0048162. The IMU 82 may have a solid state, rate gyro electronic compass that detects the direction of the earth's magnetic field using solid state magnetometers and indicates the vessel heading relative to magnetic north. Additionally, solid state accelerometers and angular rate sensors in the IMU 82 may be provided to sense the vessel's attitude and rate of turn.

The controller 34 may have a memory and a programmable processor, as will be described further herein below with respect to FIG. 3. As is conventional, the processor can be communicatively connected to a computer readable medium that includes volatile or non-volatile memory upon which computer readable code (software) is stored. The processor can access the computer readable code on the computer readable medium, and upon executing the code can send signals to carry out functions according to the methods described herein below. Execution of the code allows the controller 34 to control a series of actuators associated with the propulsion devices 14a, 14b, which actuators provide the above-mentioned variance to the direction and magnitude of thrust. Such actuators include, but are not limited to, a throttle valve, a steering actuator, a trim actuator, and a transmission associated with the propulsion devices 14a, 14b.

Each of the devices, modules, and sensors can be communicatively connected to the controller 34 via one or more controller area network (CAN) buses, such as for example as described in U.S. Pat. No. 6,273,771, which was incorporated by reference hereinabove. It should be understood that the connections shown in FIG. 1 are not the only possible connections between the devices, modules, and sensors, and that the wiring shown therein is merely exemplary and schematic. Fewer or more connections could be provided. It should also be understood that the devices, modules, and sensors could alternatively communicate wirelessly with one another and/or with the controller 34.

According to known autopilot functions, an operator of the marine vessel 12 may choose to engage in waypoint tracking, during, which the marine vessel 12 is automatically guided to a point (e.g., a global position defined in terms of latitude and longitude) or several points along a track. To initiate waypoint tracking mode, for example, the operator of the marine vessel 12 may select a point or track (route) using the input source 19 (such as a chart plotter), and then select waypoint tracking mode from the autopilot system 60, for example via a keypad or touchscreen. Alternatively, the operator can both choose a route and select the waypoint tracking mode via the input source 19. The controller 34 then obtains a first commanded heading from the autopilot system 60 (which can be separate from or integrated with the controller 34) according to the information provided by the input source 19, which first commanded heading, is intended to steer the marine vessel 12 toward the first waypoint in the route. Once the first waypoint is reached, the autopilot system 60 determines a second heading value required to travel to the second waypoint and the controller 34 commands the propulsion devices 14a, 141 to propel the vessel at the second heading. The controller 34 thus automatically guides the marine vessel 12 to each waypoint along the route (or to a single selected point) by providing steering and thrust commands to the propulsion devices 14a, 14b. If the marine vessel 12 veers off course as determined by the sensors mentioned above, such as due to the effect of wind, waves, or the like, the controller 34 determines the corrective action needed to resume the commanded heading so as to guide the marine vessel 12 back to the waypoint and/or route. The controller 34 provides steering and/or thrust commands to the propulsion devices 14a, 14b to achieve such corrective action.

In the waypoint tracking mode, the controller 34 uses a heading signal (indicating an estimate of the heading at which the marine vessel 12 is actually being propelled) to determine whether correction needs to be made to the actual heading of the marine vessel 12 in order to maintain the commanded heading to the next waypoint. The controller 34 uses the heading signal to determine how and to what extent the propulsion devices 14a, 14b must be steered (and/or with what thrust) in order to re-orient the marine vessel 12 to the commanded heading. For example, if the autopilot system 60 has commanded a heading of 350 degrees in order to reach the next waypoint in a mute, but external forces have caused the marine vessel 12 to orient itself to a heading of 345 degrees, the controller 34 will use a heading signal of 345 degrees to perform calculations to determine to what extent the propulsion devices 14a, 14b must be steered (and/or with what thrust) in order to re-orient the marine vessel 12 to a heading of 350 degrees. Such automatic correction of the heading the marine vessel 12 can be achieved according to the principles described in U.S. Pat. No. 7,267,068; U.S. Pat. No. 7,305,928; and U.S. Pat. No. 9,039,468, the disclosures of which are hereby incorporated by reference in their entirety.

Many are familiar with the capability of an input source 19 such as a chart plotter or similar type of user interface or input device to chart, save, and recall a route for a marine vessel to follow automatically. For instance, numerous waypoints defined by geographical coordinates in latitude and longitude can be input to a user input device, and connected such that they form a route for the marine vessel to follow. The waypoints can be input by the operator manually and one at a time, can be obtained in a batch from a disk or downloaded from the internet, or can be input in any number of other ways known to those having ordinary skill in the art. After the waypoints are input and stored as a route, a user can select a waypoint tracking function from the input device or from the autopilot system that allows the user to command the marine vessel to automatically travel to each of the waypoints. Each waypoint's coordinates are sent to the autopilot system 60 and/or controller 34 in turn, and the direction and magnitude of thrust of the propulsion devices 14a, 14b are controlled to travel from waypoint to waypoint, as described above.

The nuances of any particular waypoint tracking method and the exact way that data is communicated from the user input device to the autopilot system 60 and/or controller 34 are not focuses of the present disclosure. Rather, particular additional information that a user is able to input via the user input device, how this information may be input, association of this information with each individual waypoint, how this information is associated with each individual waypoint, and the controller's capability to actuate the marine propulsion devices according to this information are described in detail herein below.

Throw ah research and development, the present inventors realized that operators of a marine vessel will very rarely use a cruise control function while they are operating in waypoint tracking mode. This could be because the cruise control function is accessible via a separate screen on the chart plotter or a separate gauge altogether, rather than the same screen on the chart plotter that was used to select the waypoint tracking mode. Whatever the reason, the present inventors have realized that generally when operating in a waypoint tracking mode, an operator of a marine vessel will control the speed of the marine vessel and/or engine manually by manipulating a throttle device. This means that the operator must continually be aware of things such as speed limits, no wake zones, shallow water, crossing under bridges, fuel economy, etc. as the vessel travels along the route. The present inventors realized that it would helpful to have a single interface, and in fact a single screen, for inputting and/or selecting both a geographical location to which to travel, and a speed at which to travel to that geographical location.

FIG. 2 illustrates one example of a system 10 for controlling position and speed of a marine vessel 12 propelled by a marine propulsion device 14 along a route comprising a plurality of waypoints. An input source, such as a user interface 18, shown here as a chart plotter, is also shown in FIG. 2. The user interface 18 renders a screen 20, which may be an interactive touch-sensitive screen, on which a route 22 comprising a plurality of waypoints 24a, 24b, 24c, and 24d is shown. Although only four waypoints 24a-24d are shown in the route 22, it should be understood that fewer or more waypoints could be provided for a given route. The screen 20 also renders a map 26, which shows the different bodies of water and land in the general geographical area in which the marine vessel 12 is currently operating.

According to the present disclosure, the input source provides the plurality of waypoints to the controller 34, and each individual waypoint in the plurality of waypoints is associated with a respective operator selected desired speed of the marine propulsion device 14. For example, the user interface 18 renders the above-mentioned screen 20, whereby an operator of the marine vessel 12 can associate each individual waypoint 24a-24d in the plurality of waypoints with a respective desired speed of the marine propulsion device 14. In the example where the input source is a different device communicating with the controller 34 via a network connection or a drive or other storage device communicating with the controller 34 via a USB or similar port, the operator can input the geographical coordinates and associate them with respective desired speeds, and this data can then be saved on a remote computer or on a storage device for later uploading to the controller 34. In one example, the desired speed of the marine propulsion device 14 is the speed of the marine vessel 12, which may be described in units of miles per hour, kilometers per hour, or any other velocity value. In another example, the desired speed of the marine propulsion device 14 is a speed of an engine 16 powering the marine propulsion device 14, and may be expressed in units of rotations per minute (RPM).

The system 10 further includes a position determination device 28 (e.g. GPS receiver 29, FIG. 11 that determines an actual geographical location of the marine vessel 12. The position determination device 28 could alternatively be a compass 80, an IMU 82, or a differential GPS receiver. The system 10 also includes a speed sensor that determines an actual speed of the marine propulsion device 14. In the example where the desired speed is a vessel speed, the speed sensor could be a vessel speed sensor 30 such as a paddle wheel or a pitot tube attached to the marine vessel 12. Alternatively, a measurement of speed over ground (SOG) could be determined by the position determination device 28. In the example where the desired speed is a speed of the engine 16, the speed sensor is an engine speed sensor 32 such as, for example, a tachometer.

The system 10 also includes the controller 34, which, as described above, receives a given waypoint 24a-24d and its respective desired speed from the input source, such as the user interface 18. The controller 34 also receives the actual geographical location from the position determination device 28 and the actual speed from the speed sensor, such as engine speed sensor 32 or vessel speed sensor 30. According to the present disclosure, the controller 34 compares the actual geographical location to the given waypoint, and compares the actual speed to the respective desired speed, and outputs commands to propel the marine vessel 12 to the given waypoint and concurrently to operate the marine propulsion device 14 at the respective desired speed. The controller may do so by sending commands to the engine 16 of the propulsion device 14, as well as to any type of steering mechanism provided on the marine vessel 12, such as to the propulsion device 14 itself. In the example where the desired speed is a vessel speed, the controller 34 may command a throttle valve of the engine 16 to open or close incrementally as controlled by a feedback loop until the desired vessel speed is reached. In the example where the desired speed is an engine speed, the controller 34 may command the throttle valve to open or close to a calibrated position that is predicted to achieve the desired engine speed.

Figure 3:
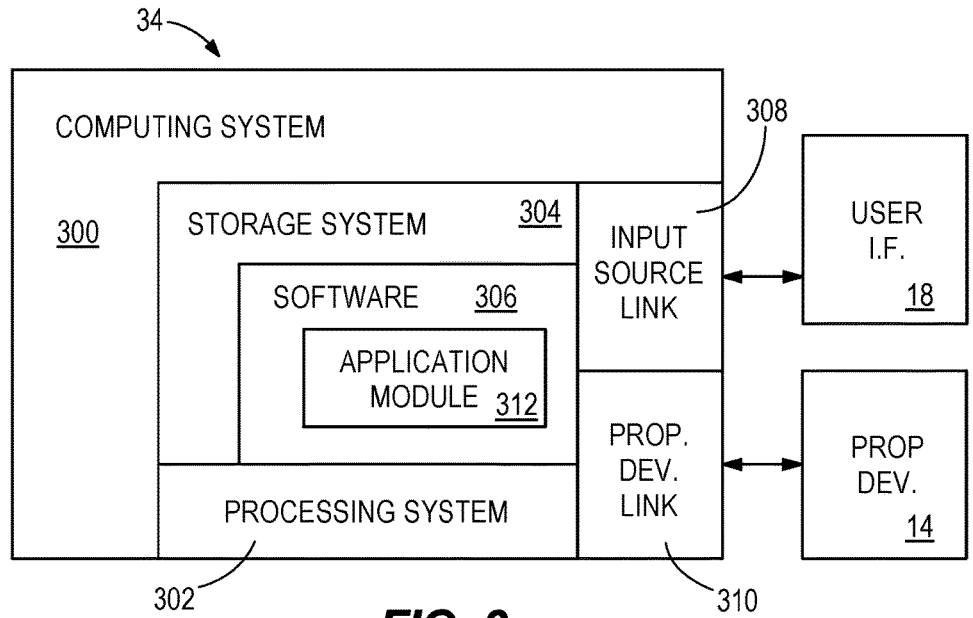
FIG. 3 illustrates one example of a controller for the system for control ing position and speed of a marine vessel described with respect to FIG. 2.

The controller 34 may have architecture such as that shown in FIG. 3. The controller 34 may include a computing system 300 that includes processing system 302, storage system 304, software 306, and input/output (I/O) interfaces such as an input source link 308 and a propulsion device (including engine) link 310. The processing system 302 loads and executes software 306 from the storage system 304, including a position and speed control software application module 312. When executed by the computing system 300, application module 312 directs the processing system 302 to operate as described herein in further detail to execute the position and speed control method.

Although the computing system 300 depicted in FIG. 3 includes one application module 312 in the present example, it should be understood that one or more modules may provide the same operation. Similarly, while the description provided herein refers to a computing system 300 and a processing system 302, it is to be recognized that implementations of such systems can be performed using one or more processors, which may be communicatively connected, and such implementations are considered to be within the scope of the description. The processing system 302 can comprise a microprocessor and other circuitry that retrieves and executes software 306 from storage system 304. Processing system 302 can be implemented within a single processing device but can also be distributed across multiple processing devices or sub-systems that cooperate in existing program instructions. Examples of processing system 302 include general purpose central processing units, applications specific processors, and logic devices, as well as any other type of processing device, combinations of processing devices, or variations thereof.

The storage system 304 can comprise any storage media readable by processing system 302, and capable of storing software 306. The storage system 304 can include volatile and non-volatile, removable and non-removable media implemented in any method or technology for storage of information, such as computer readable instructions, data structures, program modules, or other data. Storage system 304 can be implemented as a single storage device but may also be implemented across multiple storage devices or sub-systems. Storage system 304 can further include additional elements, such as a controller capable of communicating with the processing system 302. Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. It should be understood that in no case is the storage media a propagated signal.

Input source link 308 provides a hardwired or wireless link to the input source 19 (see FIG. 1), such as the user interface 18 (see FIG. 2). It should be mentioned that the computing system, processing system, storage system, software, and application module could all be located within the module of the user interface 18 itself instead of within a controller 34 that controls other functions aboard the vessel, such as a helm controller. In that case, the user interface 18 could be directly linked to the engine 16, or could be linked to the engine 16 via the controller 34 acting as a helm controller.

Besides being a chart plotter as shown in FIG. 2, the user interface 18 could alternatively or additionally include a mouse, a keyboard, a voice input device, a touch input device (including but not limited to a touch screen), a smart phone or tablet, a PDA, and other comparable input devices and associated processing elements capable of receiving user input from an operator of the marine vessel. Output devices such as a video display or graphical display can display an interface further associated with embodiments of the system and method disclosed herein. Speakers, printers, and other types of output devices may also be included in the user interface 18.

Referring back to FIG. 2, the system 10 according to the present disclosure is capable of operating such that a particular speed (vessel or engine speed) can be associated with a particular waypoint in one of many different ways. In one example, the user interface 18 includes push buttons 36 with which the operator can interact with the user interface 18. Additionally or alternatively, the screen 20 can be an interactive touch-sensitive screen that allows the operator to touch images of buttons on the screen 20 itself in order to select particular functions. In this case, the push buttons 36 may be used to display a particular screen, and then the touchscreen 20 may be used to select a specific menu or function on that screen. Alternatively, only push buttons 36 or only images of buttons on the screen 20 can be used to interact with the user interface 18. The exact way in which the operator interacts with the push buttons 36 and/or images of buttons on the screen 20 (collectively, buttons) is not limiting on the scope of the present disclosure.

In one example, the buttons allow the operator to manually associate each given waypoint 24a-24d in a route 22 with a respective desired speed. For example, a user may touch the screen 20 or place a cursor on the map 26 to create a new waypoint for a new route or to add a waypoint to an unfinished route. In the lower left-hand corner of FIG. 2, a pop-up menu 27 is shown to illustrate what might be displayed on the screen 20 if the user inputs or selects waypoint 24b (here "Waypoint 2"). Instead of creating a new waypoint and associating that new waypoint with a desired speed, the operator could alternatively select an already-defined waypoint from an already-charted route 22 by placing a cursor over the waypoint or by touching the waypoint on the touchscreen 20, and could insert a speed value to be associated with traveling to that waypoint.

Figure 4:
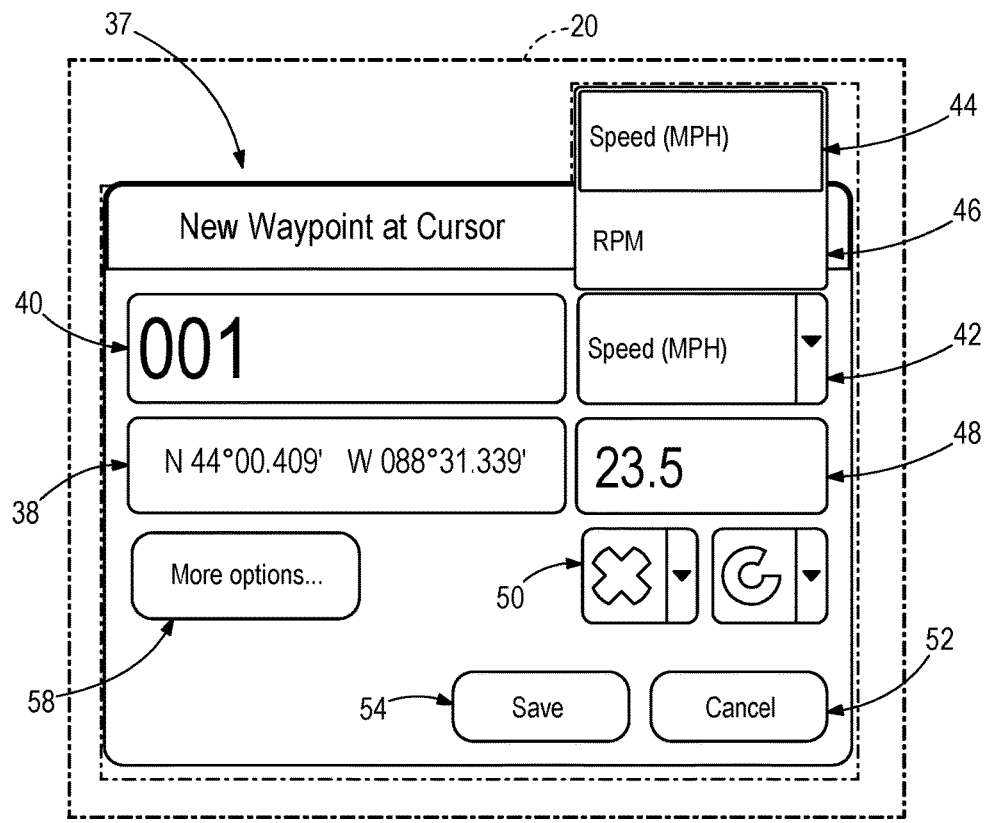
FIG. 4 illustrates one example of a pop-up menu that may be provided on a screen of a user interface according to the present disclosure.

A more detailed pop-up menu 37 is shown in to FIG. 4, via which an operator can individually input longitudinal and latitudinal coordinates for a waypoint as shown at box 38, and can label this waypoint as shown at box 40. The operator may then select from a dropdown menu, shown at 42, whether he would like the desired speed associated with the particular waypoint to be a vessel speed as shown at 44, or an engine speed as shown at 46. The operator may enter the numerical value for the desired speed at box 48. The operator can also choose to delete the waypoint by pressing the button shown at 50, to cancel entry of the waypoint by selecting the button at 52, or to save the waypoint by selecting the button at 54. Notably, this pop-up menu 37 is accessible from the very same screen view as that which was used to input and/or select waypoints and/or routes. In fact, the pop-up menu 37 may show up in the foreground of the screen, while the map 26 and route 22 remain displayed in the background. Thus, the operator does not need to access a different screen view or interact with a different gauge in order to directly associate a waypoint with a particular speed.

The operator may additionally or alternatively be able to manually associate each of the waypoints 24a-24d in the plurality of waypoints with a single desired speed. In one example, the plurality of waypoints may comprise all of the waypoints (e.g. 24a, 24b, 24c, 24d) in a particular route 22. In another example, the plurality of waypoints may comprise only a subset of the waypoints in the route 22. For example, the operator could use a cursor or his finger to select only waypoints 24c and 24d, which would be a subset of the entire route 22, and then associate a single desired speed with both of the waypoints 24c, 24d. The operator could subsequently select the waypoints 24a or 24b and associate different speeds with each of these waypoints. In other words, the user interface 18, including touchscreen 20, may allow the operator to select the subset of waypoints by individually selecting each waypoint to be included in the subset from the map 26 rendered on the display screen 20.

In another example, the touch sensitive display screen 20 may allow the operator to select the subset of waypoints by drawing a perimeter 56 around the subset (in this case still including waypoints 24c and 24d) on the map 26 rendered on the display screen 20. The operator could create this perimeter 56 by touching the touch sensitive display screen 20 and circling the waypoints 24c, 24d with his finger, or could use a cursor to circle the waypoints 24c, 24d on the map 26. Many other ways, such as by scrolling through a list of waypoints and selecting only a subset, could be used to select a subset.

Figure 5:
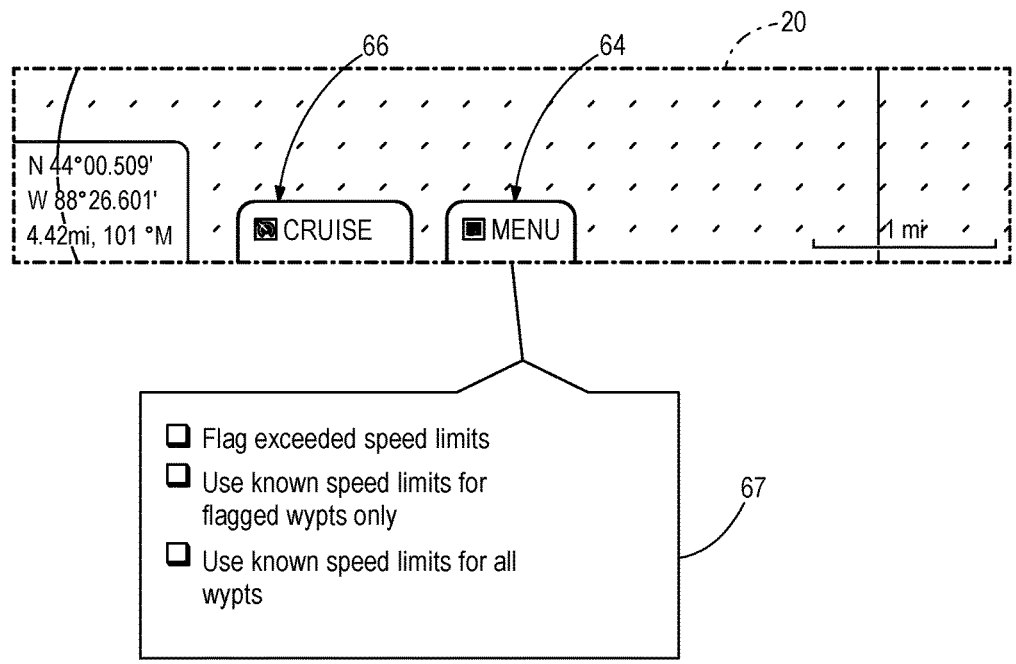
FIG. 5 illustrates a portion of an exemplary screen of a user interface, showing two selectable menus according to the present disclosure.

The user interface 18 may also include a button (push button 36 or image of a button on screen 20) that allows the operator to select a function by which the controller 34 flags any waypoints for which the respective desired speed exceeds a known waterway speed limit for a geographical area containing the waypoint. For example, referring back to FIG. 4, the user may access this function by selecting the "More options" button 58 from the waypoint pop-up menu and may then select a sub-option to flag the waypoint if it exceeds a known speed limit for the area in which the geographical coordinates entered at box 38 are located. In another example, one of the push buttons 36 shown in FIG. 2 can be labeled as a "Speed limit check" button and can be used to check all of the waypoints in the route 22, or a selected subset of the waypoints, for compliance to known speed limits. In yet another example, referring to FIG. 5, a "Menu" button 64 situated at the bottom of the screen 20 can be used to access a pop-up menu option (from pop-up menu 67) to flag any waypoints that exceed known speed limits. Again, this menu button 64 would be accessible from the very same screen on which the map 26 and route 22 are displayed, and would not require the operator to navigate away from the waypoint tracking screen. In one example, once the operator has selected the speed limit check function, the controller 34 may cause the display screen 20 to highlight on the map 26 the waypoints 24a-24d for which the respective desired speed exceeds the speed limit. For example, these waypoints could be shown in a different color, could flash in and out of view, or could be circled on the map 26 so as to bring them to the attention of the operator.

In another example, again referring to FIG. 5, the user interface 18 includes a button (e.g. "Menu" button 64) that allows the operator to select a function by which the controller 34 automatically changes the respective desired speeds of each flagged waypoint to the known speed limit for the geographical area containing each flagged waypoint. Additionally or alternatively, the user interface 18 may include a button (e.g. "Menu" button 64) that allows the operator to select a function by which the controller 34 automatically associates each given waypoint in the plurality of waypoints with a target speed based on a known waterway speed limit for a geographical area containing the given waypoint. This would allow the operator to travel at maximum allowed speeds in different waterway areas. The speed-limited areas and/or no wake zones could be shown on the map 26 in different colors, could be outlined in dashed lines, or could be brought to the operator's attention in any number of ways. The controller 34 could determine when a speed limit applied by checking the current geographical position from the position determination device 28, or future geographical position based on known speed and known location, with the data underlying the speed zones shown on the map 26.

Referring back to FIG. 2, as mentioned briefly above, it need not be a controller 34 that is separate from the user interface 18 that performs the functions of associating the desired speeds with the given waypoints. Instead, the user interface 18 could be provided with its own controller, memory, and other hardware and, software components for carrying out the method of the present disclosure. In one example, once the controller located at the user interface 18 has associated a desired speed (whether that desired speed is manually chosen by the operator or automatically chosen according to a known speed limit) with the geographical coordinate, the coordinate and its associated speed are sent to a separate controller, here shown at 34, which can incorporate both an autopilot system 60 and a cruise control system 62. The autopilot system 60 may be used to control the steering position of the propulsion device 14. The cruise control system 62 may be used to compare the actual and desired speeds (whether they are vessel speeds or engine speeds) with one another and to send commands to the throttle valve of the engine 16 in order to achieve the desired speed. This can be done according to known feedback algorithms, such as PID control algorithms.

Figure 6:
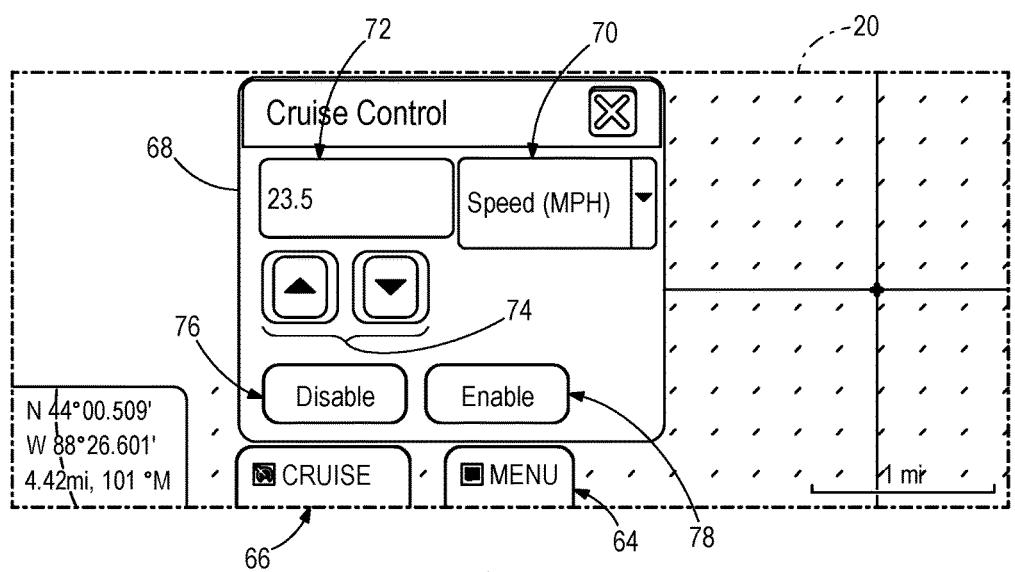
FIG. 6 illustrates one example of a pop-up menu accessible by selecting one of the exemplary menus of FIG. 5.

Again referring to FIG. 5, the operator may also use the touchscreen 20 to select a "Cruise" button 66, in which case a pop-up menu 68 as shown in FIG. 6 may appear. This pop-up menu 68 may allow the operator to change the speed associated with a particular waypoint while on the go. For example, the operator could change his choice between controlling for vessel speed or engine speed using the dropdown box 70, and/or could enter a different numerical value for the speed at box 72. Alternatively, the operator could use the up and down arrows shown at 74 to increase or decrease the numerical value of the speed by given increments. The user could also disable or enable the cruise function with the buttons shown in the pop-up menu at 76 and 78. The disable button 76 would allow the operator to take hack control of the speed of the marine propulsion device 14, rather than having the speed be controlled automatically by the one of the methods described herein above.

Other functions are accessible via the various menu buttons on the screen 20. For example, the operator can select to have a waypoint be automatically associated with a speed of the marine propulsion device 14 that achieves the best fuel economy based on known waterway conditions, trim position of the propulsion device, and/or measured load on the propulsion system. This associated speed might therefore automatically change while traveling from one waypoint to another. If this caused too many speed changes, the operator could then use the "Cruise" menu button 66 to enable cruise at a particular speed value instead of using the varying speed associated with best fuel economy. The operator could also use the menu options to choose to display a continuously updated arrival time at which the next waypoint, or a final waypoint, will be reached. The operator could try inputting different speeds for different waypoints to see how this changed the estimated arrival time. Again, each of these menu options would be accessible from the user interface 18, such as the chart plotter shown in FIG. 2, from the same screen on which the map 26, route 22, and waypoints are shown. The map 26 could remain in the background while the user selects any of the speed control functions described herein. This would present an easy way for the operator to associate speeds with different waypoints before or while operating the propulsion system in the waypoint tracking mode.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A system for controlling position and speed of a marine vessel propelled by a marine propulsion device along a route comprising a plurality of waypoints, the system comprising:
   a controller in signal communication with the marine propulsion device;
   an input source that provides the plurality of waypoints to the controller, each individual waypoint in the plurality of waypoints being manually associated by an operator of the marine vessel with a respective numerical value of a desired speed of the marine propulsion device;
   a position determination device that determines an actual geographical location of the marine vessel; and
   a speed sensor that determines an actual speed of the marine propulsion device;
   wherein the controller receives a given waypoint and its respective desired speed from the input source, the actual geographical location from the position determination device, and the actual speed from the speed sensor;
   wherein the controller compares the actual geographical location to the given waypoint and the actual speed to the respective desired speed, and outputs commands to propel the marine vessel to the given waypoint and concurrently to operate the marine propulsion device at the respective desired speed;
   wherein the input source is a user interface that allows the operator to associate each given waypoint with its respective desired speed; and
   wherein the user interface includes a user-selectable function by which the controller flags any waypoints for which the respective desired speed exceeds a known waterway speed limit for a geographical area containing the waypoint.

2. The system of claim 1, wherein the user interface includes buttons with which the operator can manually associate each given waypoint with its respective desired speed.

3. The system of claim 2, wherein the user interface includes buttons with which the operator can manually associate each of the waypoints in the plurality of waypoints with a single desired speed.

4. The system of claim 3, wherein the plurality of waypoints comprises all the waypoints in the route.

5. The system of claim 3, wherein the plurality of waypoints comprises a subset of all the waypoints in the route.

6. The system of claim 5, wherein the user interface includes a touch-sensitive display screen that allows the operator to select the subset of all the waypoints by individually selecting each waypoint to be included in the subset from a map rendered on the display screen.

7. The system of claim 5, wherein the user interface includes a touch-sensitive display screen that allows the operator to select the subset of all the waypoints by drawing a perimeter around the subset on a map rendered on the display screen.

8. The system of claim 1, wherein the user interface includes a touch-sensitive display screen, and wherein the controller causes the display screen to highlight the flagged waypoints on a map rendered on the display screen.

9. The system of claim 1, wherein the user interface includes a button that allows the operator to select a function by which the controller automatically changes the respective desired speed associated with each flagged waypoint to the respective known waterway speed limit for the geographical area containing the flagged waypoint.

10. The system of claim 1, wherein the desired speed of the marine propulsion device is one of a speed of the marine vessel and a speed of an engine powering the marine propulsion device, and wherein the speed sensor senses one of an actual speed of the marine vessel and an actual speed of the engine, respectively.

11. A non-transient computer readable medium programmed with computer readable code that upon execution by a processor causes the processor to execute a method for controlling position and speed of a marine vessel propelled by a marine propulsion device along a route comprising a plurality of waypoints, the method comprising:
   accepting the plurality of waypoints from an input source, each individual waypoint in the plurality of waypoints being manually associated by an operator of the marine vessel with a respective numerical value of a desired speed of the marine propulsion device;
   rendering a screen on a user interface that allows the operator to associate each individual waypoint in the plurality of waypoints with its respective desired speed; and
   sending the plurality of waypoints and the respective desired speeds to a marine propulsion system controller, which thereafter outputs commands to propel the marine vessel to a given waypoint and concurrently to operate the marine propulsion device at the respective desired speed;
   wherein the screen on the user interface allows the operator to one of manually associate each given waypoint with a potentially unique respective desired speed, and manually associate each of the waypoints in the plurality of waypoints with a single desired speed; and wherein the screen on the user interface allows the operator to select each of the waypoints in the plurality of waypoints, which comprises a subset of all the waypoints in the route, by one of individually selecting each waypoint to be included in the subset from a map rendered on the screen, and drawing a perimeter around the subset on the map rendered on the screen.

12. The non-transient computer readable medium of claim 11, wherein the method further comprises:

causing the screen on the user interface to highlight any waypoints for which the respective desired speed exceeds a known waterway speed limit for a geographical area containing the waypoint.

13. The non-transient computer readable medium of claim 12, wherein the method further comprises:

rendering an option on the screen on the user interface that allows the operator to select a function by which each given waypoint in the plurality of waypoints is automatically associated with a target speed based on the known waterway speed limit for the geographical area containing the given waypoint.

14. The non-transient computer readable medium of claim 11, wherein the screen on the user interface allows the operator to select a given waypoint from an already-charted route and to associate a respective desired speed with the given waypoint.

15. The non-transient computer readable medium of claim 11, wherein the screen on the user interface allows the operator to add a given waypoint to a new or unfinished route and to associate a respective desired speed with the added given waypoint.

* * * * *